United States Patent [19]

Disteldorf et al.

[11] Patent Number: 4,772,665
[45] Date of Patent: Sep. 20, 1988

[54] HEAT- AND OXIDATION-RESISTANT POLYURETHANE COATINGS

[75] Inventors: Josef Disteldorf, Herne; Werner Flakus, Recklinghausen, both of Fed. Rep. of Germany

[73] Assignee: Chemische Werke Hüls Aktiengesellschaft, Herne, Fed. Rep. of Germany

[21] Appl. No.: 454,563

[22] Filed: Dec. 30, 1982

[30] Foreign Application Priority Data

Dec. 30, 1981 [DE] Fed. Rep. of Germany ....... 3151854

[51] Int. Cl.$^4$ .................... C08L 75/04; C08L 75/06
[52] U.S. Cl. .................... 525/123; 525/440
[58] Field of Search ............ 525/123, 440; 528/73

[56] References Cited

U.S. PATENT DOCUMENTS

| | | | |
|---|---|---|---|
| 3,115,479 | 12/1963 | Windemuth | 528/73 |
| 4,288,586 | 9/1981 | Bock et al. | 528/73 |
| 4,379,905 | 4/1983 | Stemmler | 528/73 |

FOREIGN PATENT DOCUMENTS

| | | | |
|---|---|---|---|
| 755152 | 3/1967 | Canada | 528/73 |
| 837120 | 6/1960 | United Kingdom . | |
| 1030571 | 5/1966 | United Kingdom | 528/73 |

Primary Examiner—John C. Bleutge
Assistant Examiner—A. Carrillo
Attorney, Agent, or Firm—Oblon, Fisher, Spivak, McClelland & Maier

[57] ABSTRACT

A polyurethane coating composition comprising:

(a) a synthetic organic polymer containing at least two hydroxyl groups, (b) a polyisocyanatoisocyanurate having the formula:

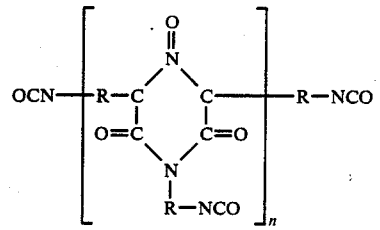

wherein the R groups may be the same or different and are selected from the group consisting of divalent hydrocarbon radicals having the formulas:

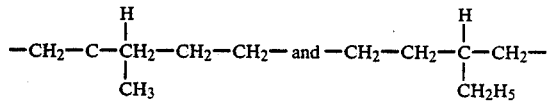

and n represents a whole or a fractional number from 1 to 5, and (c) optionally, conventional auxiliary agents selected from the group consisting of solvents, dispersing agents, pigments, fillers, and spreading agents, can be subjected to cold or hot curing, and provides a cured coating composition having good resistance to thermal oxidation, good solvent resistance and good mechanical film properties.

7 Claims, No Drawings

HEAT- AND OXIDATION-RESISTANT POLYURETHANE COATINGS

BACKGROUND OF THE INVENTION

1. Field of the Invention

This invention relates to polyurethane coating compositions and more particularly to polyurethane coatings based on polyisocyanatoisocyanurates.

2. Description of the Prior Art

Good polyurethane resin (PUR) materials and coatings can be produced using aromatic polyisocyanates and suitable hydroxyl components. However, they have the disadvantage that they tend to become yellow when exposed to daylight.

Therefore, for demanding applications it is necessary to convert cyclic polyisocyanates, such as isophorone diisocyanate (IPDI) or its oligomers or adducts with compounds of appropriate structure into light-stable PUR systems. End products of this type also have thermal and oxidative stability. However, these resins are not suitable for cold curing and are preferably utilized in hot curing applications. The resins are very compatible, but they do not form extremely solvent resistant coatings.

Aliphatic polyisocyanates, their oligomers and adducts in combination with suitable hydroxyl containing components are well-known reactive systems for cold curing. During hot curing or when stored at high temperature, they tend to yellow. This is also the case with the monomeric diisocyanates as well as with the biuret forms, the isocyanurates and the diol/triol adducts, including the aliphatic diisocyanates known in the literature and the aforementioned derivatives such as, for instance, the hexamethylenrediisocyanate (HDI), the 2,2,4 (2,4,4)trimethylhexamethylenediisocyanate (TMDI) or the 2-methylnonamethylene diisocyanate (MNDI).

Starting from bicyclic and tricyclic isocyanates and using suitable hydroxyl compounds, PUR coatings with a remarkable thermal stability but with a distinct yellowing tendency and limited weatherability are obtained. Tricyclodecane diisocyanate (TCDI) is an example.

Therefore, a need has continued to exist for a polyurethane coating having good heat-stability, a low tendency to become yellow and good stability to weathering.

SUMMARY OF THE INVENTION

Accordingly, it is an object of the invention to provide polyurethane coating compositions which have good thermal stability.

A further object is to provide polyurethane coating compositions which do not have a tendency to become yellow under exposure to daylight.

A further object is to provide polyurethane coating compositions having good stability to weathering.

A further object is to provide a polyurethane coating composition which can be cured both at low temperatures and at high temperatures.

A further object is to provide a polyurethane coating composition having good solvent resistance.

Further objects of the invention will be apparent from the description which follows.

The objects of the invention have been attained by a polyurethane coating composition comprising:

(a) a synthetic organic polymer containing at least two hydroxyl groups, (b) a polyisocyanatoisocyanurate having the formula:

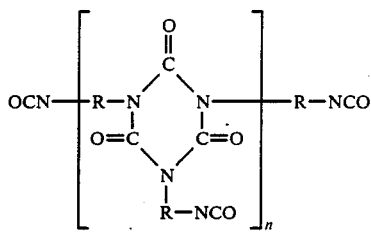

wherein the R groups may be the same or different and are selected from the group consisting of divalent hydrocarbon radicals having the formulas:

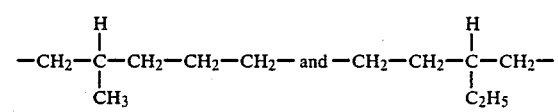

and n represents a whole or a fractional number from 1 to 5, and (c) optionally, conventional auxiliary agents selected from the group consisting of solvents, dispersing agents, pigments, fillers, and spreading agents.

DETAILED DESCRIPTION OF THE INVENTION AND PREFERRED EMBODIMENTS

The polyisocyanatoisocyanurates having the formula above are not part of this invention. They are formed by the partial trimerization of a diisocyanate of the formula

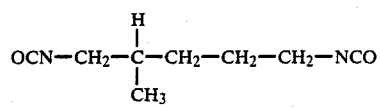

or a mixture of diisocyanates consisting of a diisocyanate of the above formula with a diisocyanate having the formula:

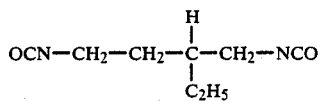

In principle, the trimerization can be carried out with all the known trimerization catalysts, for instance, those described in Unexamined West German application Nos. 26 44 684, 29 15 201, and British Pat. No. 837,120. Pure diisocyanate of the first-mentioned formula or a mixture of the two diisocyanates serves as the starting material.

The mixtures of diisocyanates usually have the following compositions:

88–99 weight percent 2-methyl-1,5-pentane diisocyanate (MPDI)

12–1 weight percent 2-ethyl-1,4-butane diisocyanate (EBDI)

The production of the diisocyanates or mixtures thereof is carried out by the known method of phosgenation of the corresponding amines, (cf. U.S. Pat. No. 3,631,198).

Polyacrylate compounds containing hydroxyl groups (hydroxyacrylates) or hydroxyl-group-containing polyesters (hydroxyesters) are used as the organic polymer containing hydroxyl groups.

The excellent quality of the polyurethane coatings in accordance with the invention lies in their unique thermal-oxidative resistance up to 240° C. without the appearance of any yellowing, which cannot be achieved by the conventional aliphatic isocyanates mentioned above and is characteristic only of the polyurethanes based on cyclic sterically hindered polyisocyanates, e.g., IPDI.

This property of the polyurethanes in accordance with the invention is achieved by cold curing as well as hot curing of the reaction components. Another outstanding quality of the polyurethanes prepared in accordance with the invention is their photostability and weathering resistance, which is better than that of the cyclic sterically hindered polyisocyanates.

The solvent resistance of the polyurethanes prepared in accordance with the invention is significantly better than that of the polyurethanes derived from cyclic polyisocyantates. This quality is all the more interesting, since the reaction components used for preparing the coatings according to the invention are very compatible and easily soluble resins.

In addition, the polyurethanes in accordance with the invention possess good mechanical film properties.

To produce PUR coatings having the above described range of properties, hydroxyl components are preferably used which are readily available and distributed as commercial products, such as hydroxyl-containing polyacrylate compounds (hydroxyacrylates) and hydroxyl-containing polyesters (hydroxyesters) to the extent they are suitable for reaction with the isocyanurates in accordance with the invention, based on their hydroxyl equivalents, structure and quality.

Depending on the intended application, coatings can be produced which are solvent-based, or which contain little solvent or no solvent.

The coatings can be clear films and sheets, but they can also include pigments or fillers, as well as other auxiliary agents, such as spreading agents, colorants, thixotropic agents, etc. The PUR systems claimed in this invention can include hard, intermediate or soft elastic final products. They can be used as substrate coatings, for example, for metal, plastic, wood or concrete.

Having generally described the invention, a more complete understanding can be obtained by reference to certain specific examples, which are provided herein for purposes of illustration only and are not intended to be limiting unless otherwise specified.

The examples are summarized in Tables 1 to 4. In all systems, the solvent ethylene glycol acetate (EGA)/xylene was used in a weight ratio of 2:1.

EXAMPLE 1

The thermal-oxidation stability of the cold and hot-cured sheet steel coatings can, for example, be determined very simply by heating the coatings at 240° C. for 10 minutes and recording the degree of discoloration occurring.

In Table 1 the thermal-oxidation behavior of polyurethane coatings prepared from various polyisocyanates and the hydroxyester systems Desmophen 651 ® manufactured by the Bayer Co., with a hydroxyl number of 263 mg KOH/gram is compared with the coating system in accordance with the invention containing the aforementioned hydroxyester.

The color changes were designated as follows:
0-1 white
2-3 minimal yellowing
4-5 noticeable yellowing
6-7 intense yellowing
8-9 beige discoloration Table 1

Thermal oxidation study: 10 minutes annealing at 240° C. of cold cured and hot cured polyurethane coatings, starting from polyisocyanates in combination with the hydroxyester system Desmophen 651 ® from Bayer AG. OH:NCO ratio=1:1, PVK 15, $TiO_2$ Kronos Cl 310 from Kronos Titan GmbH.

| Polyisocyanates | Color data Starting sheet steel | Color data after heating 10 min at 240° |
|---|---|---|
| 4,4-diisocyanateodicyclohexylmethane (Hylene W) | 0 | 1 |
| Tricyclodecanediisocyanate (TCDI) | 0 | 9 |
| Dodecamethylene diisocyanate (DDDI) | 0 | 7 |
| Isophorone diisocyanate trimethylolpropane adduct (IPDI-TMP) (3:1) | 0 | 1 |
| 2-methylpentamethylene diisocyanate TMP adduct 2-MPDI:TMP (3:1) | 0 | 2 |
| IPDI-isocyanurate | 0 | 1 |
| Isocyanurate (composition of 2-MPDI the invention) | 0 | 1 |
| MDI-isocyanurate | 0 | 4 |
| (2,2,4(2,4,4)) trimethyl-hexamethylene diisocyanate isocyanurate (TMDI) | 0 | 4 |
| 5-methylnonamethylene diisocyanate biuret 5-MNDI | 0 | 8 |
| Hexamethylene diisocyanate biuret (HDI) | 0 | 9 |

EXAMPLE 2

Table 2 shows the cold curing capability (the pendulum hardnesses on days 1, 3 and 7 as compared to the hot cure) of the polyurethane systems of this invention in combination with the hydroxyester system Desmophen 651 ® of Bayer.

The Erichsen cupping values of the coatings of this invention show excellent elasticity, while the 20° Gardner gloss values indicate a high gloss and, thus, an outstanding compatibility of the resin systems.

Table 2

(Sheet steels)

Film data of polyurethanes produced from various polyisocyanates in combination with the hydroxyester system Desmophen 651 ® of Bayer AG, OH-value=263 mg KOH/g, ratio NCO:OH 1:1.

Pigmentation: $TiO_2$, Kronos Cl 310 of Kronos Titan GmbH, PVK 15, catalysis 0.1% tributylamine +0.01% dibutyl tin(II) laurate.

| Polyisocyanate components* | Cure | Layer thickness μ | Pendulum hardness Konig DIN 53 157 m seconds | | | Erichsen cupping DIN 53156 in mm | Gardner values ASTM-D 523 | | |
|---|---|---|---|---|---|---|---|---|---|
| | | | 1st | 3rd | 7th day | | 20° | 60° | 85° |
| HDI-isocyanurate | hot | 50 | 183 | — | — | 7.0 | 73 | 86 | 95 |
| | cold | 55 | 51 | 117 | 128 | 7.4 | 75 | 88 | 96 |
| HDI-biuret | hot | 60 | 179 | — | — | 7.1 | 83 | 90 | 96 |
| | cold | 60 | 10 | 147 | 200 | 2.4 | 79 | 88 | 90 |
| 2-MPDI-iso-cyanurate (composition of the invention) | hot | 40 | 187 | — | — | 6.0 | 83 | 91 | 96 |
| | cold | 50 | 46 | 146 | 186 | 7.9 | 84 | 93 | 96 |
| 2-MPDI-TMP-adduct | hot | 50 | 179 | — | — | 8.3 | 77 | 84 | 96 |
| | cold | 50 | 18 | 108 | 119 | 9.0 | 76 | 84 | 96 |
| IPDI-isocyanurate | hot | 60 | 187 | — | — | 0.3 | 46 | 75 | 89 |
| | cold | 50 | 42 | 84 | 127 | 1.3 | 58 | 77 | 90 |

*in each case 30′ at 130° C., cold cure

EXAMPLE 3

In analogy to the information presented in Table 2, Table 3 shows polyurethane coatings according to the invention based on hydroxyacrylates compared with other polyisocyanates (cold cure, gloss and Erichsen cupping). Furthermore, the outstanding solvent resistance of the MPDI-isocyanurate coating is demonstrated.

80, presented in comparison with other analogous polyisocyanate systems.

Table 4

Osram-Sylt-Test—Gardner gloss values ASTM-D-523 Polyurethane system produced from various polyisocyanates, in each case by reaction with the hydroxyacrylate system Lumitol ® AM 80 of BASF AG. NCO:OH conversion 1:1 Pigmentation: TiO₂, Kronos Cl 220

| Polyisocyanate components* | Cure | Layer thickness μ | Konic Pendulum hardness DIN 53 157 m seconds | | | Erichsen cupping DIN 53156 in mm | Gardner gloss values ASTM-D 523 | | | Solvent resistance (rub test) (+) = resistance (−) = susceptible | | |
|---|---|---|---|---|---|---|---|---|---|---|---|---|
| | | | 1st | 3rd | 7th day | | 20° | 60° | 80° | MEK | Xylene glycol | Ethylene acetate |
| HDI-isocyanurate | hot | 50 | 165 | — | — | 9.3 | 72 | 89 | 96 | + | + | + |
| | cold | 40 | 13 | 105 | 113 | 9.9 | 73 | 87 | 99 | | | |
| HDI-biuret | hot | 60 | 160 | — | — | 9.2 | 59 | 84 | 94 | − | − | − |
| | cold | 60 | 10 | 44 | 85 | 10.0 | 70 | 88 | 95 | | | |
| 2-MPDI-iso-cyanurate (composition of the invention) | hot | 50 | 171 | — | — | 8.4 | 83 | 90 | 99 | + | + | + |
| | cold | 60 | 16 | 74 | 159 | 9.8 | 78 | 87 | 97 | | | |
| 2-MPDI-TMP adduct | hot | 60 | 176 | — | — | 9.0 | 72 | 90 | 93 | + | + | + |
| | cold | 60 | 13 | 68 | 111 | >10.0 | 75 | 86 | 95 | | | |
| IPDI-iso-cyanurate | hot | 70 | 183 | — | — | 0.5 | 75 | 90 | 96 | − | − | − |
| | cold | 60 | 18 | 64 | 115 | 0.4 | 70 | 88 | 95 | | | |

*in each case 30′, 130° C. cold cure.
MEK = methyl ethyl ketone of Kronos Titan GmbH, PVK 15

| Polyisocyanates* | Initial gloss values | | | Gloss values after 1000 hrs Osram-Sylt Test | | | Gloss values after 2000 hrs Osram-Sylt-Test | | |
|---|---|---|---|---|---|---|---|---|---|
| | 20° | 60° | 85° | 20° | 60° | 85° | 20° | 60° | 85° |
| HDI-biuret | 59 | 84 | 94 | 52 | 75 | 95 | 37 | 62 | 92 |
| HDI-isocyanurate | 68 | 80 | 98 | 58 | 76 | 97 | 50 | 72 | 95 |
| IPDI-isocyanurate | 68 | 88 | 95 | 50 | 72 | 97 | 35 | 72 | 97 |
| 2-MPDI-isocyanurate | 87 | 87 | 97 | 68 | 80 | 96 | 60 | 76 | 96 |

*in each case 30′ at 130° and cold cure.

EXAMPLE 4

The Osram-Sylt test in the presence of water permits a qualitative differentiation of the light and weather resistance of films of differing resin compositions. Gardner gloss values (ASTM-D-523) measured at time intervals of 1,000 and 2,000 hours served as the basis for the evaluation.

Table 4 shows the light and weather resistance of the coating prepared in accordance with the invention 2-MFDI-isocyanurate hydroxyacrylate, Lumitol ® AM

Having now fully described the invention, it will be apparent to one of ordinary skill in the art that the many changes and modifications can be made thereto without departing from the spirit or scope of the invention as set forth herein.

What is claimed as new and desired to be secured by Letters Patent of the United States is:

1. A polyurethane coating composition comprising:

(a) a synthetic organic polymer containing at least two hydroxyl groups, (b) a polyisocyanatoisocyanurate having the formula:

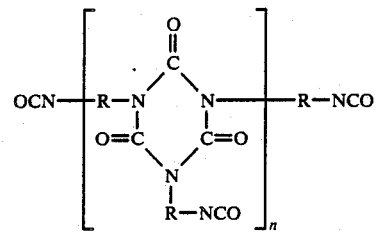

wherein the R groups may be the same or different and are selected from the group consisting of divalent hydrocarbon radicals having the formulas

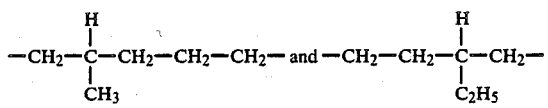

and n represents a whole or a fractional number from 1 to 5, and (c) optionally, conventional auxiliary agents selected from the group consisting of solvents, dispersing agents, pigments, fillers, and spreading agents.

2. The coating composition of claim 1, wherein said organic polymer containing hydroxyl groups is a polyacrylate.

3. The coating composition of claim 1, wherein said organic polymer containing hydroxyl groups is a polyester.

4. A cured polyurethane coating composition comprising the reaction product of (a) a synthetic organic polymer containing at least two hydroxyl groups, (b) a polyisocyanatoisocyanurate having the formula:

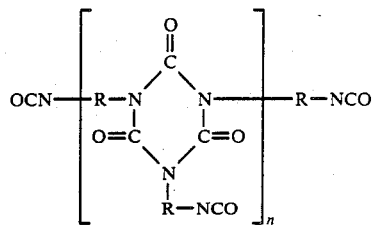

wherein the R groups may be the same or different and are selected from the group consisting of divalent hydrocarbon radicals having the formulas:

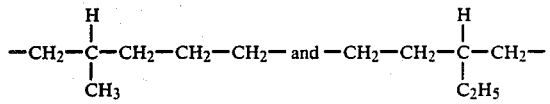

and n represents a whole or a fractional number from 1 to 5, and (c) optionally, conventional auxiliary agents selected from the group consisting of solvents, dispersing agents, pigments, fillers, and spreading agents.

5. The cured composition of claim 4 wherein said organic polymer containing hydroxyl groups is a polyacrylate.

6. The cured coating composition of claim 4 wherein said organic polymer containing hydroxyl groups is a polyester.

7. A polyurethane coating composition comprising:

(a) a polyacrylate containing at least two hydroxyl groups, (b) a polyisocyanatoisocyanurate having the formula:

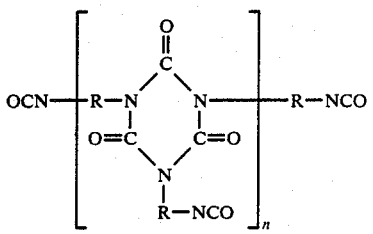

wherein the R groups may be the same or different and are selected from the groups consisting of divalent hydrocarbon radicals having the formulas:

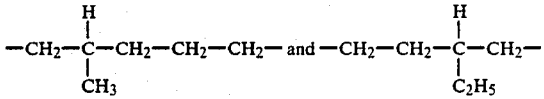

an n represents a whole or a fractional number from 1 to 5, and (c) optionally, conventional auxiliary agents selected from the group consisting of solvents, dispersing agents, pigments, fillers, and spreading agents.

* * * * *